(12) United States Patent
Popovich et al.

(10) Patent No.: US 8,186,837 B2
(45) Date of Patent: May 29, 2012

(54) WIDE ANGLE DISPLAY DEVICE

(75) Inventors: Milan Momcilo Popovich, Leicester (GB); Antoine Yvon Messiou, Leicester (GB)

(73) Assignee: Milan Momcilo Popovich (GB)

( * ) Notice: Subject to any disclaimer, the term of this patent is extended or adjusted under 35 U.S.C. 154(b) by 248 days.

(21) Appl. No.: 12/517,129

(22) PCT Filed: Nov. 26, 2007

(86) PCT No.: PCT/IB2007/003646
§ 371 (c)(1),
(2), (4) Date: Jun. 1, 2009

(87) PCT Pub. No.: WO2008/065509
PCT Pub. Date: Jun. 5, 2008

(65) Prior Publication Data
US 2009/0323186 A1     Dec. 31, 2009

(30) Foreign Application Priority Data
Nov. 30, 2006    (GB) .................................. 0623893.5

(51) Int. Cl.
*G02B 27/32*    (2006.01)

(52) U.S. Cl. ..................................................... 359/505
(58) Field of Classification Search ........... 359/503–505
See application file for complete search history.

(56) References Cited

U.S. PATENT DOCUMENTS

| | | | |
|---|---|---|---|
| 4,082,434 A | 4/1978 | Hayashi et al. | |
| 4,257,670 A | 3/1981 | Legrand | |
| 4,892,399 A | 1/1990 | Ahn | |
| 5,357,367 A * | 10/1994 | Goldstein | ..................... 359/504 |
| 6,511,186 B1 | 1/2003 | Burstyn et al. | |

FOREIGN PATENT DOCUMENTS

| WO | 00/41024 A1 | 7/2000 |
|---|---|---|
| WO | 2005/109071 A1 | 11/2005 |

OTHER PUBLICATIONS

International Search Report for PCT/IB2007/003646, May 19, 2008.
Ultra Vista Door Viewer, http://web.archive.org/web/20040827001328/www.doorviewers.ca/spec.htm, archive of website on Aug. 30, 2004.

* cited by examiner

*Primary Examiner* — Euncha Cherry
(74) *Attorney, Agent, or Firm* — Brooks Kushman P.C.

(57) ABSTRACT

A wide angle viewing apparatus for security applications is disclosed. The apparatus comprises a wide-angle lens and a diffusing screen. The wide-angle lens incorporates an image inverter and a means for eliminating stray light.

16 Claims, 11 Drawing Sheets

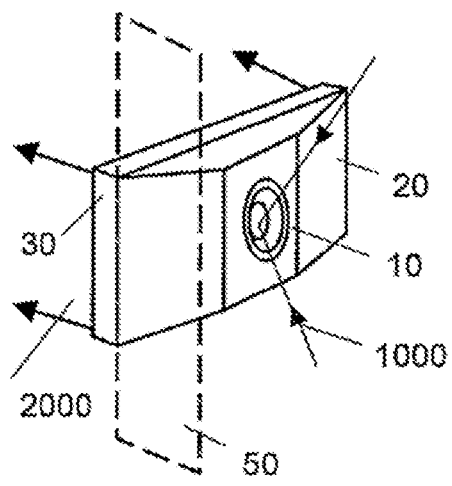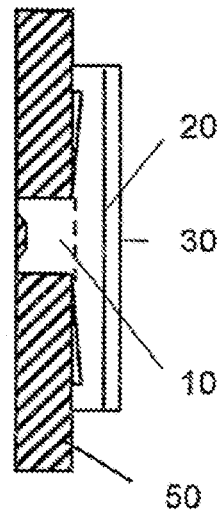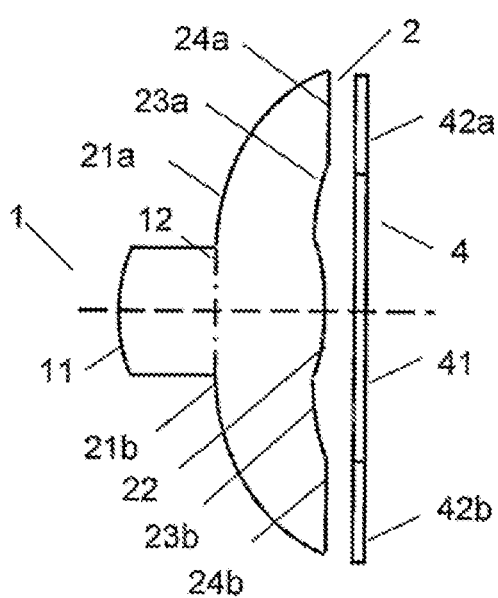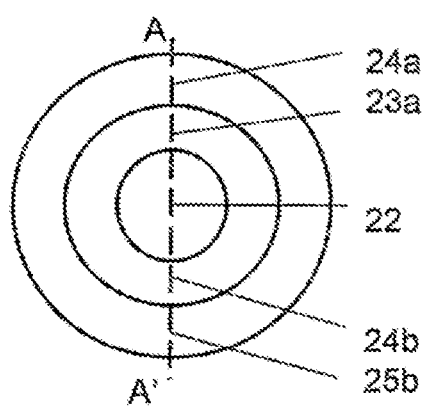
FIG. 1A  FIG. 1B
FIG. 2A  FIG. 2B

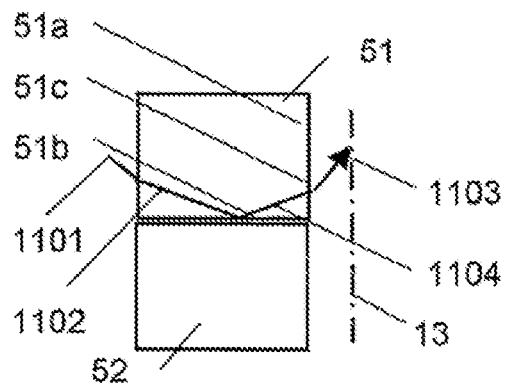
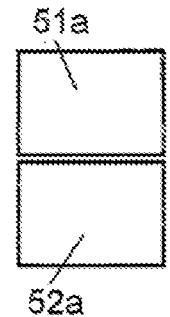
FIG. 2C  FIG. 2D
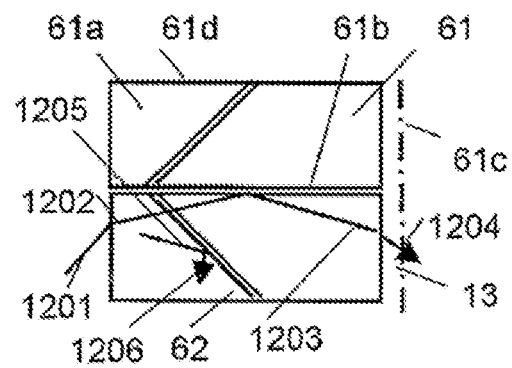
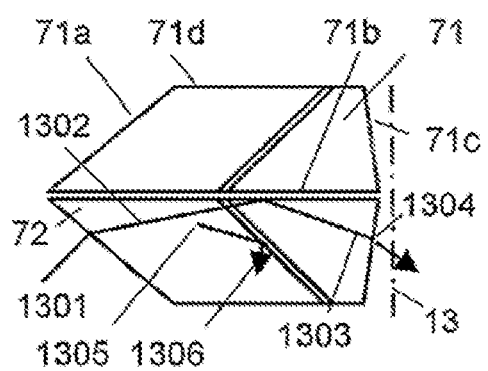
FIG. 2E  FIG. 2F
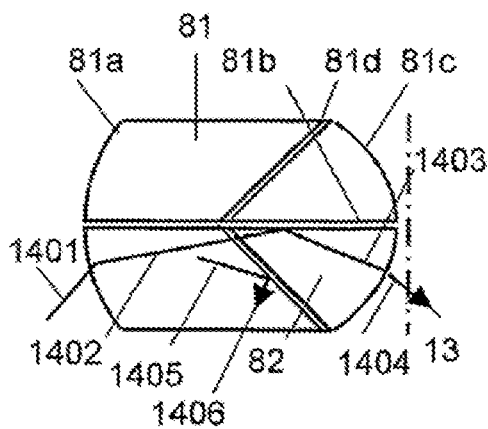
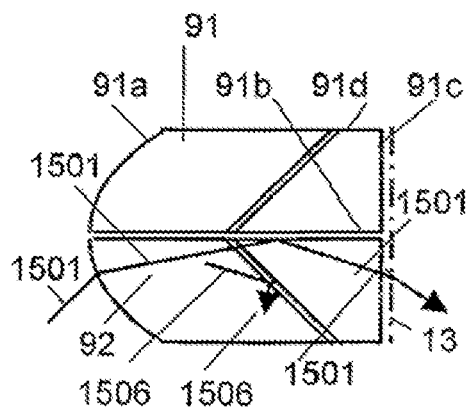
FIG. 2G  FIG. 2H

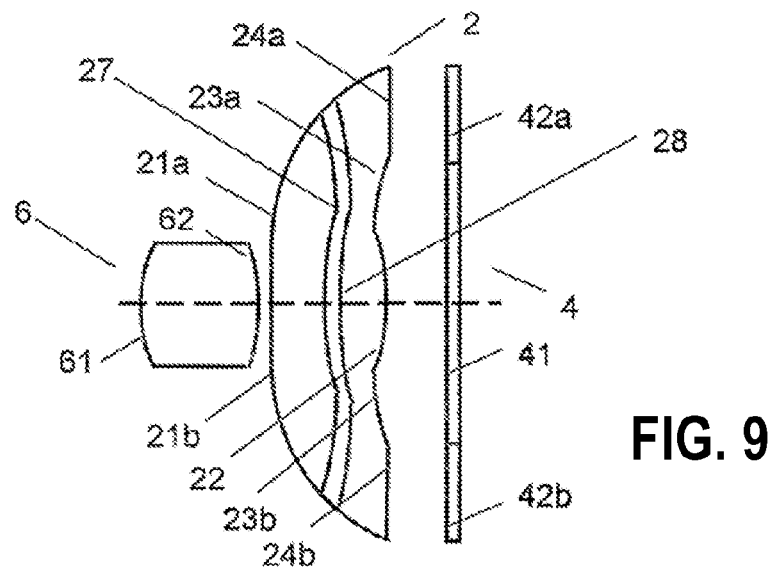
FIG. 9
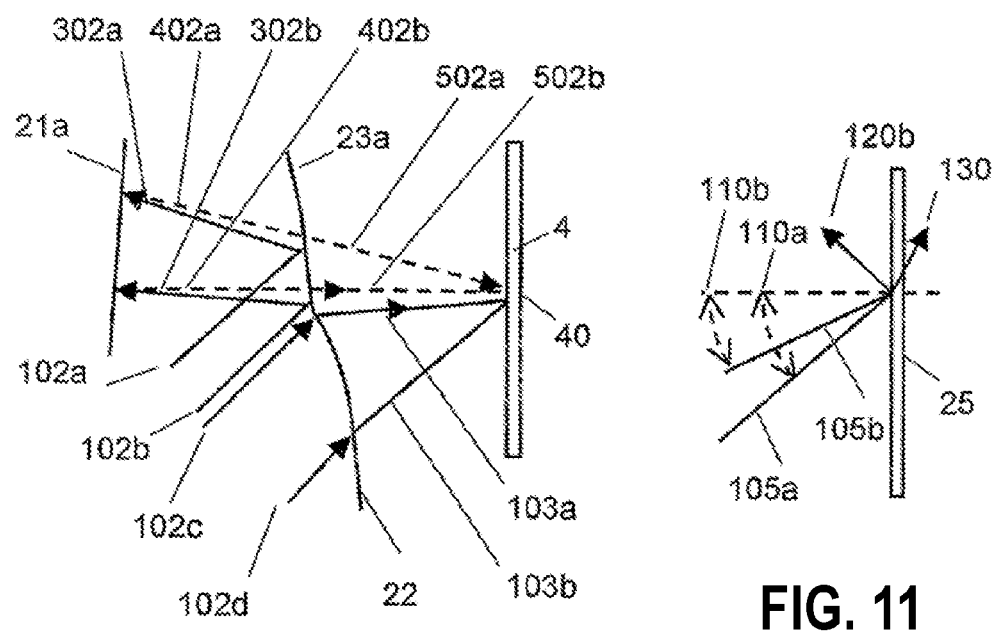
FIG. 10
FIG. 11

WIDE ANGLE DISPLAY DEVICE

REFERENCE TO PRIORITY APPLICATION

The application claims the priority of United Kingdom patent application No. GB0623893.5 filed on 30 Nov. 2006.

BACKGROUND OF THE INVENTION

This invention relates to a viewing device, and more particularly to a wide angle viewing apparatus for security applications.

Door viewers for home security are well known. One common approach provides a peephole incorporating a miniature wide-angle lens. Peepholes suffer from the problem that the viewer's face must be pressed against a tiny hole.

U.S. Pat. No. 4,082,434 discloses a wide-angle door viewer comprising a concave objective lens, an intermediate concave lens and a convex eyepiece lens. The eyepiece lens is positioned at a predetermined distance from the objective lens. The intermediate lens corrects the aberration of the erect virtual image formed by the objective lens. The eyepiece lens magnifies the image formed by the intermediate lens. A magnified final erect virtual image is formed on the eyepiece lens. The U.S. Pat. No. 4,082,434 apparatus suffers from the problem that the location of the virtual image makes it impractical to insert a diffusing screen to provide a real image. Therefore, the user's eye must be positioned close to the eyepiece lens. Further, the small effective diameter of the concave objective lens results in a dim image. Increasing the effective diameter of the concave objective lens to provide a brighter image will allow visual access from outside unless a shutter is incorporated into the viewer.

U.S. Pat. No. 4,257,670 discloses an optical peephole device comprising three lens assemblies disposed serially along a common optical axis. The first assembly provides a doublet comprising a thick-edged meniscus and a double-concave lens. The second assembly comprises five identical plano-convex lenses equidistantly spaced from each other. The third assembly provides accommodation and comprises a plano-convex lens and an eyepiece. An erect virtual image formed by the meniscus is converted into an inverted real image by the plano-convex lens. The other plano-convex lenses correct aberrations and performs a second inversion on said inverted real image, such that the final erect real image is formed on the plano-convex lens. The disadvantage of the U.S. Pat. No. 4,257,670 apparatus is that although the image derived from the plano-convex lens is erect and real, the luminance of the final image suffers from the transmission losses incurred by the large number of lenses. As in the case of the U.S. Pat. No. 4,082,434 apparatus it is not possible to provide a real image and consequently the user's eye must be positioned close to the eyepiece. Furthermore, the device is not suitable for typical domestic door applications due to its large overall length.

U.S. Pat. No. 4,892,399 by Ohn discloses a door viewer comprising two prisms of rectangular isosceles triangle shape in cross section whose hypotenuse surfaces abut horizontally, a front convex lens, an intermediate plano-convex lens and a plano-convex eyepiece lens. The front convex lens has a front concave surface and a rear convex surface to correct chromatic aberration. The convex surfaces of the intermediate and eyepiece lenses are positioned face to face with each other to correct barrel distortion. The door viewer casts an image onto a ground glass screen formed on or provided abutting the eyepiece lens.

Door viewers based on the principles of the Ohn device are capable of providing a small real image, typically 25-60 millimeters in size, that can be viewed from a small distance. A commercially available door viewer based on the Ohn invention, known as the Ultra Vista door viewer, is distributed via the internet website www.doorviewers.ca. The Ultra Vista door viewer provides a 132° horizontal field of view and has an output image screen size of approximately 57 millimeters diameter. The image may be viewed from a range of approximately 2 meters and has the appearance of a miniature television display. The required door opening size is 56 millimeters for door thicknesses in the approximate range 20 to 45 millimeters. However, door viewers based on the Ohn invention suffer from the problem that the viewing screen size roughly determines the size of the door hole. It is therefore difficult to provide a large area screen using a viewer designed according to the principles of the Ohn invention.

There are several problems to be overcome in designing a door viewer with a small door aperture and a large area screen. To achieve a high image brightness the lens system requires a numerically low F-number, where F-number is defined as the focal length of the image projection lens divided by the effective aperture of the lens.

There are trade-offs to be made between the angle of surveillance, the range of screen viewing angles available to users, screen size and door size. Basic optical theory dictates that product of the entrance pupil area multiplied by the light collection solid angle corresponding to the field of surveillance should be roughly equal to the maximum screen viewing solid angle multiplied by the screen area. Providing a door viewer with a large viewing screen, a wide field of surveillance and a wide viewing angle will tend to increase the size of the entrance pupil. This in turn will increase the overall diameter of the lens and hence the size of door hole required.

In order to minimize the thickness of the door viewer the projection screen should have a large bend angle. In other words, the screen should be capable of directing light incident at a steep angle to the screen surface into an average direction substantially normal to the screen surface. It is difficult to maximize the photometric and screen thickness requirements simultaneously.

U.S. Pat. No. 6,511,186 by Burstyn et al discloses a screen in which light rays having acute incidence angles of a screen are deflected into the viewing space by Total Internal Reflection (TIR) Fresnel lens elements or by diffractive elements. However, the apparatus disclosed by Burstyn is not suitable for numerically small F-number illumination due to the small dimensions of the Fresnel lens facets.

There is a need for a low cost door viewer that offers a large viewable area, ideally around 100 to 150 millimeters diagonal. The field of view should be 130 degrees horizontal. The installation requirements should be no more demanding in terms of door alterations and installer skill than existing technologies. The screen should be viewable from a range of around 2 meters and for a representative range of viewer heights. Desirably, the door hole size should be in the range 40-60 mm. The device should have minimal projection from the front or rear surfaces of the door. The device should provide means for eliminating stray light that may impair the quality of the output image.

Thus there exists a need for an improved door viewer that can provide a wide field of surveillance, a large area viewable image and a thin form factor requiring only a small door aperture.

SUMMARY OF THE INVENTION

It is an object of the present invention to provide an improved door viewer with a wide field of surveillance, a large area viewable image, and a thin form factor requiring only a small door aperture.

The objects of the invention are achieved in a first embodiment comprising a wide-angle lens system incorporating an image inverter, a multiple reflection lens system and a diffusing screen. The wide-angle lens system is optically coupled to the multiple reflection lens system and is disposed between the multiple reflection lens and the external scene. The multiple reflection lens system comprises at least a first transmitting surface operative to admit light from an external scene into the door viewer, a second transmitting surface for transmitting a first region of the field of surveillance towards a viewer; a third transmitting surface for transmitting a second region of the field of surveillance towards a viewer; a first reflecting surface; and a second reflecting surface. A first multiplicity of optical paths from said external scene to the viewer passes through the first transmitting surface, traversing at least one light refracting medium and passing through the second transmitting surface towards the viewer. A second multiplicity of optical paths from said external scene to said viewer passes through the first transmitting surface, undergoing a first reflection at the first reflecting surface and a second reflection at the second reflecting surface, and passing through the third transmitting surface towards the viewer, said paths traversing at least one light refracting medium. The first multiplicity of optical paths corresponds to incident light having an angle of incidence at the first transmitting surface less than or equal to a predefined value and said second multiplicity of optical paths corresponds to incident light having an angle of incidence at the first transmitting surface greater than said predefined value.

The second reflecting surface surrounds the first transmitting surface. The first reflecting surface surrounds the second transmitting surface and the third transmitting surface surrounds both the first reflecting surface and the second transmitting surface. In a preferred operational configuration the second transmitting surface, the first reflecting surface and the third transmitting surface lie on a first single continuous surface and the first transmitting source and the second reflecting surface lie on a second single continuous surface. Said first and second single continuous surfaces enclose at least one refractive index medium.

At least one of the second or third transmitting surfaces of the multiple reflection lens system may have diffusing characteristics.

Each surface of the multiple reflection lens system may be characterized by one of a spherical, Fresnel, diffractive or aspheric optical surface form. Each surface of the multiple reflection lens system may have an anamorphic surface form. Each surface of the multiple reflection lens system may have a conical surface form.

At least one of the first and second reflecting surfaces of the multiple reflection lens system may function as a total internal reflection surface. At least one of the first and second reflecting surfaces of the multiple reflection lens system may have a reflective coating.

The wide angle lens system and the multiple reflection lens system together form an image of the external scene on the diffusing screen.

The image inverter is an optical device operative to invert the input image in at least the vertical sense. The image inverter incorporates at least one air gap orientated to block the propagation of stray external light by means of total internal reflection In the first embodiment of the invention the image inverter comprises a pair of identical upper and lower optical components. Each component further comprises an input surface that admits light from the external scene, a reflecting surface and an exit surface. The reflecting surfaces of said components are disposed back-to-back arranged back-to-back substantially overlapping and parallel to each other. Said upper component is operative to provide a vertical inversion to light incident above a predetermined angle of incidence and said lower component is operative to provide a vertical inversion to light incident below a predetermined angle of incidence. Each component comprises two optical elements disposed in sequence along the light path from the external scene. The first element has a first surface that provides the input surface of the image inverter and a second surface. The second element has a first surface of the same shape as the second surface of the first element and a second surface that provides the exit surface of the image inverter. The second surface of the first element and the first surface of the second element are separated by a small air gap. The second surface of the first element operates as a total internal reflection surface for light from the external scene incident in directions that will not result in a reflection at the planar reflecting surface. Incident ambient light that is not directed out of the inverter by the second surface of the first element passes through the input surface is reflected by said reflecting surface and finally passes through the exit surface. At least one of said first surface of said first element and said second surface of said second element may be curved. At least one of said first surface of said first element and said second surface of said second element may be tilted surfaces. At least one of said first surface of said first element and said second surface of said second element may conical surfaces.

The reflecting surface in each component of the inverter may be mirror coated or may alternatively be a total internal reflection surface. Desirably, said reflecting surfaces are aligned parallel to the horizontal viewing plane. In the case where the reflecting surfaces rely on total internal reflection, said surfaces would be separated by a small air gap. Where a mirror coating is used the reflecting surfaces may be in contact. Said input and exit surfaces may be planar. Alternatively, at least one of said input and exit surfaces may be curved.

The diffusing screen is disposed between the multiple reflection lens system and the viewer. Said diffusing screen comprises a central portion disposed between the second transmitting surface of the multiple reflection lens system and the viewer and a surrounding portion disposed between the third transmitting surface and the viewer. The central portion of the diffusing screen is designed to bend rays emerging from the central portion of the multiple reflection lens into a predetermined viewing direction. The outer portion of the diffusing screen is designed to bend rays emerging from the outer portion of the multiple reflection lens into a predetermined viewing direction.

All of the optical surfaces of the door viewer may have a common axis of symmetry.

In another embodiment of the invention similar to the first embodiment a further lens system is disposed between the second transmitting surface of the multiple reflection lens system and the central portion of the diffusing screen.

In another embodiment of the invention similar to the first embodiment the multiple reflection lens systems is divided into two air spaced portions such that the first and second multiplicity of ray paths each traverse at least one air space.

The air space is enclosed by a pair of opposing optical surfaces. Said opposing surfaces may have any of the optical surface forms used in the first embodiment and may each comprise more than one type of optical surface form.

In another embodiment of the invention similar to the first embodiment the first multiplicity of optical paths corresponds to incident light having angles of incidence less than the critical angle at the first reflecting surface. The second multiplicity of optical paths corresponds to incident light having angles of incidence greater than or equal to the critical angle at the first reflecting surface.

The objects of the invention are achieved in a further embodiment in which the multiple reflection lens of the first embodiment is divided into first and second optical elements. In said alternative embodiment of the invention the image inverter comprises a pair of identical upper and lower components. Said upper component is operative to provide a vertical inversion to light incident above a predetermined angle of incidence and said lower component is operative to provide a vertical inversion to light incident below a predetermined angle of incidence. Each component further comprises an input surface, a reflecting surface and an exit surface. In said alternative embodiment of the invention the first element of the MLR has a first surface that admits light from the wide-angle lens and a second surface. The second element has a first surface of the same shape as the second surface of the first element and a second surface. The second surface of the first element and the first surface of the second element are separated by a small air gap. The second surface of the first element operates as a total internal reflection surface for light from the external scene incident in directions that did not result in a reflection at the planar reflecting surface. At least one of said first surface of said first element and said second surface of said second element may be curved. At least one of said first surface of said first element and said second surface of said second element may be tilted surfaces. At least one of said first surface of said first element and said second surface of said second element may conical surfaces. Incident ambient light that is not directed out of the multiple reflection lens by the second surface of the first element is imaged according to the principles of the first embodiment of the invention.

The objects of the invention are achieved in a further embodiment comprising a wide-angle lens and a diffusing screen. The wide-angle lens incorporates an image inverter. Said further embodiment eliminates the multiple reflection lens discussed above. The image inverter comprises a pair of identical upper and lower optical components. Said upper component is operative to provide a vertical inversion to light incident above a predetermined angle of incidence and said lower component is operative to provide a vertical inversion to light incident below a predetermined angle of incidence. Each component further comprises an input surface that admits light from the external scene, a reflecting surface and an exit surface. The reflecting surfaces of said components are disposed back-to-back substantially overlapping and parallel to each other. Each said optical component is divided into first and second optical elements disposed in sequence along the light path from the external scene. The first element has a first surface that provides the input surface of the image inverter and a second surface. The second element has a first surface of the same shape as the second surface of the first element and a second surface that provides the exit surface of the image inverter. The second surface of the first element and the first surface of the second element are separated by a small air gap. The second surface of the first element operates as a total internal reflection surface for light from the external scene incident in directions that will not result in a reflection at the planar reflecting surface. Incident ambient light that is not directed out of the inverter by the second surface of the first element passes through the input surface is reflected by said reflecting surface and finally passes through the exit surface. At least one of said first surface of said first element and said second surface of said second element may be curved. At least one of said first surface of said first element and said second surface of said second element may be tilted surfaces. At least one of said first surface of said first element and said second surface of said second element may conical surfaces. The wide-angle lens may further comprise at least one separated optical element disposed between the inverter and the screen. The wide-angle lens may further comprise at least one separate optical element disposed between the external scene and the inverter. The wide-angle lens forms an image of the external scene on the screen.

A more complete understanding of the invention can be obtained by considering the following detailed description in conjunction with the accompanying drawings wherein like index numerals indicate like parts. For purposes of clarity details relating to technical material that is known in the technical fields related to the invention have not been described in detail.

BRIEF DESCRIPTION OF THE DRAWINGS

FIG. 1A is a schematic three-dimensional view of an operational configuration of then invention.

FIG. 1B is a schematic three-dimensional view of an operational configuration of then invention.

FIG. 2A is a schematic side elevation view of a first embodiment of the invention.

FIG. 2B is a schematic rear elevation view of a first embodiment of the invention.

FIG. 2C is a schematic side elevation view of an image inverter that may be used in the invention.

FIG. 2D is a schematic front elevation view of an image inverter that may be used in the invention.

FIG. 2E is a schematic side elevation view of another image inverter that may be used in the invention.

FIG. 2F is a schematic side elevation view of a further image inverter that may be used in the invention.

FIG. 2G is a schematic side elevation view of a further image inverter with that may be used in the invention.

FIG. 2H is a schematic side elevation view of a yet further another image inverter that may be used in the invention.

FIG. 9 is a schematic side elevation view of a yet further embodiment of the invention.

FIG. 10 is a schematic side elevation view of a detail of a first embodiment of the invention.

FIG. 11 is a schematic side elevation view of an optical surface used in a further embodiment of the invention.

DETAILED DESCRIPTION OF THE INVENTION

Figure 3:
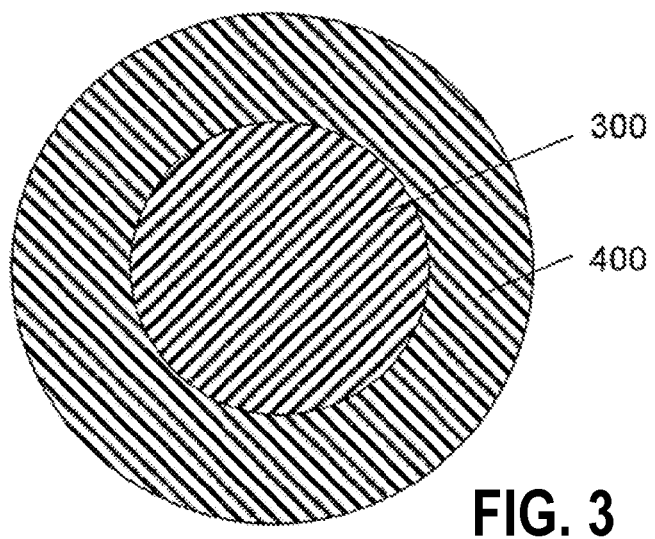
FIG. 3 is a schematic rear elevation view showing the central and peripheral regions of the displayed image.

The basic concept of a door viewer according to the principles of the invention is shown in FIG. 1. FIG. 1A shows a schematic three-dimensional view of a door viewer. In a first embodiment of the invention the door viewer comprises a wide-angle lens system 10, multiple reflection lens system 20 and a viewing screen element 30. Said wide-angle lens system comprises at least an image inverter which will be described in more detail below and an optical interface to said multiple reflection lens systems. The wide-angle lens system may further comprise additional lens elements. FIG. 1B shows a schematic side elevation showing the door viewer in a typical operational configuration. The wide-angle lens system is inserted into a cylindrical hole in the door 50. In FIG. 1A the input rays are generally indicated by 1000 and the output rays are generally indicated by 2000. It should be noted that FIG. 1 is provided only for the purposes of showing the approximate appearance of the invention in a typical operational configuration. The details of the optical system are discussed in the descriptions of the embodiments of the invention given below.

A first embodiment of the door viewer is illustrated schematically in FIG. 2. According to FIG. 2A the door viewer comprises a wide-angle lens system 1 a multiple reflection lens system 2 and a diffusing screen 4. The wide-angle lens system comprises at least a front refracting surface 11 and a surface 12 that provides the entrance surface to the multiple reflection lens system. Surface 12 may be an internal surface of the wide-angle lens. Alternatively, surface 12 may be the rear surface of the wide-angle lens, said rear surface being either in contact with or air-separated from the multiple reflection lens system. Alternatively, the wide-angle lens may form part of the multiple reflection lens system, with surface 12 corresponding to a virtual surface separating the wide-angle and multiple reflection lens systems.

The multiple reflection lens system comprises the entrance surface 12, the curved reflecting surfaces 21a, 21b, a central curved surface portion 22, the curved reflective surface portions 23a, 23b and the curved transmitting surface portions 24a, 24b. In a preferred embodiment of the invention surfaces 21a, 12, 21b form a first single continuous surface and surfaces 24a, 23a, 22, 23b, 24b form a second single continuous surface. Said first and second surfaces enclose at least one refracting medium. Desirably the refracting medium is an optical plastic. Alternatively the refracting medium many be an optical glass. For the purposes of describing the invention the lenses will be assumed to be axi-symmetric and the invention will be discussed in terms of rays confined to the meridional plane intersecting the points AA'. It will also be understood that that curved reflecting surfaces 21a, 21b and 23a, 23b and curved transmitting surface portions 24a, 24b represent intersection of annular surface areas with said meridional plane. Hence, the multiple reflection lens system comprises the entrance surface 12, the curved reflecting surfaces 21a, 21b, a central curved surface portion 22, the curved reflective surface portions 23a, 23b and the curved transmitting surface portions 24a, 24b. FIG. 2B provides a rear elevation vide view of the rear surface of the multiple reflection lens system showing the disposition of the actual surface portions corresponding to meridional section surfaces 24a, 23a, 22, 23b, 24b. The reflecting surfaces of the multiple reflection lens system may rely on total internal reflection. Alternatively, the reflecting surface may use mirror coatings. Each surface of the multiple reflection lens system may be characterized by one of a spherical, Fresnel, diffractive or aspheric optical surface form. Each surface of the multiple reflection lens system may have an anamorphic surface form. Each surface of the multiple reflection lens system may have a conical surface form.

The wide-angle lens 1 has two main functions. The first function is to collect light over a large field angle. Typically the wide-angle lens collects light from 0 degrees to greater than ±60 degrees. Since the multiple reflection lens effectively inverts the image it is necessary to apply an opposite inversion. Accordingly, the second function of the wide-angle lens is to reverse the orientation of the image in at least the vertical direction. The wide-angle lens therefore incorporates an image inverter which will be described in the following paragraphs.

The wide-angle lens system may incorporate one or more lens elements. The lens may be designed to provide an internal aperture stop. Alternatively the lens may be designed to have an external stop as, for example, in a landscape lens. The wide-angle lens system may include at least one of spherical, aspherical, diffractive and other surface forms known to those skilled in the art. The invention is not limited to any particular type of wide-angle lens configuration.

The image inverter is an optical device operative to invert the input image in at least the vertical sense. In one embodiment of the invention the image inverter comprises a pair of identical upper and lower optical components. Said upper component is operative to provide a vertical inversion to light incident above a predetermined angle of incidence and said lower component is operative to provide a vertical inversion to light incident below a predetermined angle of incidence. Each said optical component comprises an input surface that admits light from the external scene, a planar reflecting surface and an exit surface. The reflecting surfaces of said components are disposed back-to-back substantially overlapping and parallel to each other. Incident ambient light passes through the input surface is then reflected by said reflecting surface and finally passes through the exit surface. The reflecting surface may be mirror coated or may alternatively be a total internal reflection surface. Desirably, said reflecting surfaces are aligned parallel to the horizontal viewing plane. In the case where the reflecting surfaces rely on total internal reflection, said surfaces would be separated by a small air gap. Where a mirror coating is used the reflecting surfaces may be in contact. Said input and exit surfaces may be planar. Alternatively, at least one of said input and exit surfaces may be curved.

Each said optical component is divided into first and second optical elements disposed in sequence along the light path from the external scene and separated by an air gap. The purpose of the air gap is to block the propagation of stray external light by means of total internal reflection. Stray light is defined as any external light following paths that do not intersect with one of the reflecting surfaces described above. The first element has a first surface that provides the input surface of the image inverter and a second surface. The second element has a first surface of the same shape as the second surface of the first element and a second surface that provides the exit surface of the image inverter. The second surface of the first element and the first surface of the second element are separated by a small air gap. The second surface of the first element operates as a total internal reflection surface for light from the external scene incident in directions that will not result in a reflection at the planar reflecting surface. Incident ambient light that is not directed out of the inverter by the second surface of the first element passes through the input surface is reflected by said reflecting surface and finally passes through the exit surface. At least one of said first surface of said first element and said second surface of said second element may be curved. At least one of said first surface of said first element and said second surface of said second element may be tilted surfaces.

FIGS. 2C-2G show examples of preferred operational embodiments of the image inverter. FIG. 2C and FIGS. 2E to 2H show schematic side elevation views. The basic principles of the image inverter may be understood by referring first to FIG. 2C and FIG. 2D where FIG. 2D is a front elevation view of the image inverter shown in FIG. 2C. The image inverter incorporates at least one air gap designed to block the propagation of stray external light by means of total internal reflection. The configuration and function of the air gap will be illustrated in FIGS. 2E-2H and is not shown in FIG. 2C and FIG. 2D. The inverter comprises a pair of identical elements 51,52. The element 51 comprises an input surface 51a, a reflecting surface 51b and an exit surface 51c. The reflecting surface 51b may be mirror coated or may alternatively be a total internal reflection (TIR) surface. The reflecting surfaces would be separated by a small air gap in the case of a TIR configuration. Where a mirror coating is used the reflecting surfaces may be in contact. The image inversion process is indicated in a schematic fashion by the rays 1101,1102,1103, 1104. A virtual surface 13 marked by a dashed line represents the effective aperture of the image rotator. The surface 13 may lie outside the image rotator as shown. The surface 13 may coincide with the exit surface of the image rotator. The surface 13 may coincide with the entrance surface 12. Alternatively, the surface 13 may be separated from the entrance surface 13 by an air gap. Alternatively, the surface 13 may be an internal surface of the multiple reflection lens system.

As shown in the front elevation schematic view of FIG. 2D the image inverter may have a rectangular cross section. FIG. 2D shows the front surfaces 51a, 52a of the elements 51,52 illustrated in FIG. 2C. The image inverter may have other cross section shapes according to the application and the available physical aperture. For example the cross section may be designed to fit inside a circular aperture.

FIG. 2E shows an example of an image inverter similar to the one shown in FIG. 2C. The inverter comprises a pair of identical components 61,62. The component 61 comprises a planar input surface 61a, a planar reflecting surface b1b, a planar exit surface 61c and an outer surface 61d. The component 61 includes an air gap bounded by the planar surfaces 63a, 64a. The exit surface and the reflecting surface form a right angle. The image inversion process is indicated in a schematic fashion by the ray path indicated by the rays 1201, 1202,1203,1204. The path of a ray that undergoes total internal reflection at an air gap is indicated by 1205,1206. Surfaces 63a,64a and surfaces 63b,64b may represent planar surfaces. In alternative embodiments surfaces 63a,64a and surfaces 63b,64b may represent curved surfaces. In alternative embodiments surfaces 63a,64a and surfaces 63b,64b may represent cross sections of conical surfaces.

FIG. 2F shows another example of an image inverters that may be used in the invention. The inverter comprises a pair of identical optical components 71,72. The component 71 comprises a planar input surface 71a, a planar reflecting surface 71b and a planar exit surface 71c. The component 71 includes an air gap bounded by the planar surfaces 73a, 74a. The input and exit surfaces are both tilted with respect to the reflecting surface. The image inversion process is indicated in a schematic fashion by the rays 1301,1302,1303,1304. The path of a ray that undergoes total internal reflection at an air gap is indicated by 1305,1306. Surfaces 73a,74a and surfaces 73b, 74b may represent planar surfaces. In alternative embodiments surfaces 73a,74a and surfaces 73b,74b may represent curved surfaces. In alternative embodiments surfaces 73a, 74a and surfaces 73b,74b may represent cross sections of conical surfaces.

In principle the multiple reflection lens could be designed to provide all of the optical power necessary to form the final real image. However with aberration control in mind it would be advantageous to incorporate some degree of optical power within the wide-angle lens. A wide-angle lens incorporating the planar surface image inverter shown in FIGS. 2C-2F would therefore require additional lens elements to provide optical power. The need for further lens elements may be avoided by including curved surfaces in the image inverter.

FIG. 2G shows one example of an image inverter that also provides optical power. The inverter comprises a pair of identical optical components 81,82. The component 81 comprises a curved input surface 81a, a planar reflecting surface 81b and a curved exit surface 81c. The component 81 includes an air gap bounded by the planar surfaces 83a,84a. The image inversion process is indicated in a schematic fashion by the ray path indicated by the rays 1401,1402,1403,1404. The path of a ray that undergoes total internal reflection at an air gap is indicated by 1405,1406. Surfaces 83a,84a and surfaces 83b,84b may represent planar surfaces. In alternative embodiments surfaces 83a,84a and surfaces 83b,84b may represent curved surfaces. In alternative embodiments surfaces 83a,84a and surfaces 83b,84b may represent cross sections of conical surfaces.

FIG. 2H shows another example of an image inverter that also provides optical power. The inverter comprises a pair of identical optical components 91,92. The component 91 comprises a curved input surface 91a, a planar reflecting surface 91b and a planar exit surface 91c. The component 91 includes an air gap bounded by the planar surfaces 83a,84a. The image inversion process is indicated in a schematic fashion by the ray path indicated by the rays 1501,1502,1503,1504. The path of a ray that undergoes total internal reflection at an air gap is indicated by 1505,1506. Surfaces 93a,94a and surfaces 93b,94b may represent planar surfaces. In alternative embodiments surfaces 93a,94a and surfaces 93b,94b may represent curved surfaces. In alternative embodiments surfaces 93a,94a and surfaces 93b,94b may represent cross sections of conical surfaces.

Many other image inversion schemes similar to those described above will be apparent to those skilled in the art.

The screen 4 is fabricated from a rear projection screen material having a suitable diffusion angle. The diffusion angle will be determined from consideration of the required range of viewing distances and viewer heights. As shown in FIG. 2A the screen comprises a central portion 41 and outer annular portion represented by 42a, 42 according to the earlier defined geometrical convention. The central portion 41 and the outer portions 42a, 42b of the screen may be designed to provide different diffusion characteristics. For example, the central and outer positions may be fabricated from different materials. Alternatively, the central and outer portions may have different structures. One or both of the screen portions may incorporate diffractive structures, which are designed to have combined light bending and diffusing properties. The screens may be based on Fresnel surfaces. One or more portions of the screen may employ holographic light shaping diffusers. The screen may be physically separated from the surfaces of the lens 3 and the multiple reflection lens 2. Alternatively the screen may abut the surfaces the lens 3 and the multiple reflection lens 2. The screen may be curved. The screen may be implemented on one or both of the outer surfaces of the multiple reflection lens 2 as a thin layer of scattering material deposited onto said outer surfaces or a surface relief structure formed in said outer surface. The screen may be designed to direct light into vertical directions that are substantially downwards.

The formation of the viewed image according to the first embodiment of the invention using the apparatus of FIG. 2 is now explained with reference to FIG. 3 and FIG. 4. FIG. 3 illustrates the geometrical characteristics of the image displayed on the screen. A central circular image portion 300 is formed as a result of low incidence angle light propagating through surface 11 of the wide-angle lens system element, the virtual interface 13, surface 22 of the multiple reflection lens system, lens 3 and screen element 41. An annular image region 400 substantially abutting the circular region is formed as a result of high incidence angle light propagating through surface 11 of the wide angle lens system and the virtual interface 13, undergoing reflections at surfaces 23a, 23b and 21a, 21b, and propagating through transmitting surfaces 24a, 24b and screen elements 42a, 42b. The effect of any visible join between the central and annular regions 300,400 can be minimized by careful optical design. However, a visible boundary is likely to acceptable for most applications. The formation of the image regions 300 and 400 will now be explained in more detail with reference to FIG. 4.

Figure 4:
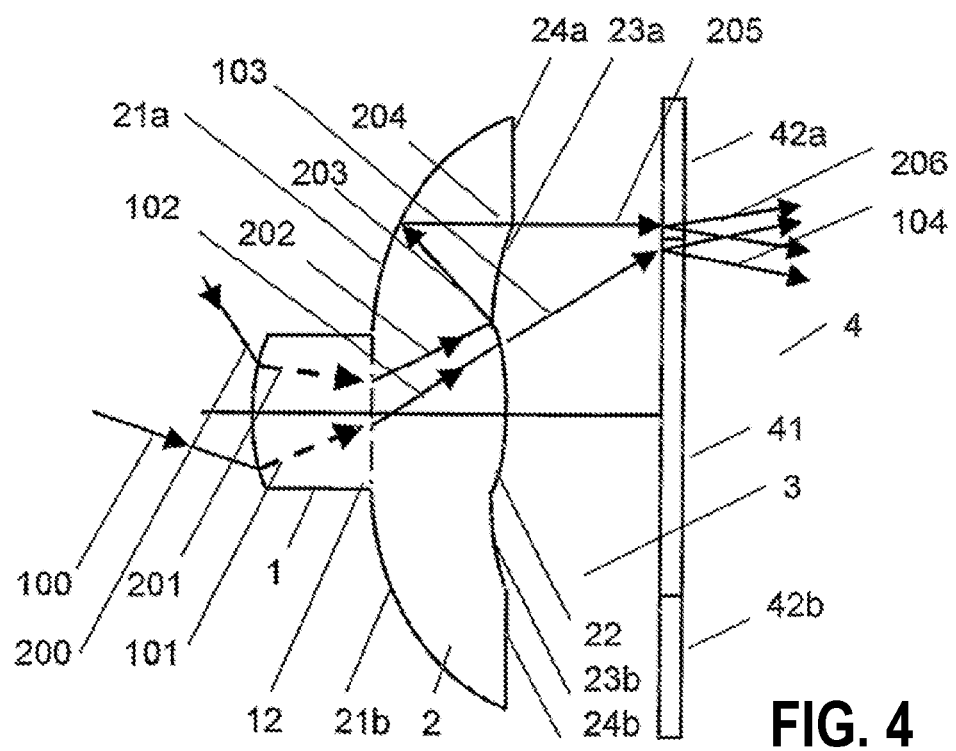
FIG. 4 is a schematic side elevation view showing the propagation of rays in a first embodiment of the invention.

FIG. 4 shows the propagation of incident light rays in the meridional plane. We consider a low incidence angle ray 100 and a high incidence angle ray 200. The ray 100 is the limiting ray that corresponds to the edge of the circular region 300. In other words rays with incidence angles equal to or less than that of the ray 100 will be imaged in the circular region 300. The ray 200 is the limiting ray that defines the inner edge of the outer annular region 400. In other words rays with incidence angles equal to or greater than that of the ray 200 will be imaged in the annular image region 400. In practice the precise ray paths through the wide-angle lens system will depend on the optical configuration of the wide-angle lens and the type of image rotation mechanism incorporated therein. In order to simplify the explanation of the invention the ray paths through the wide-angle lens have not been shown in detail. It may be assumed that the wide-angle lens incorporates an image inverter based on similar principles to the ones shown in FIGS. 2C to 2H. Accordingly, the paths of the rays inside the wide-angle lens system are represented by the dashed lines 101, 201. After propagation through the wide-angle lens the rays 101, 201 enter the multiple reflection lens as the rays 102 and 202 respectively.

We first consider the propagation of the incident ray 200 after propagation through the wide-angle lens and into the multiple reflection lens system 2. The ray 202 intercepts the first reflective surface 23a and is reflected in the direction 203 towards the second reflective surface 21a where it is reflected into the direction 204. The reflected ray 204 impinges on the refracting surface 24a where it is refracted into the direction 205 towards the screen element 42a. The ray is scattered at the screen element 42a into the diffuse ray directions generally indicated by 206.

We now consider the propagation of the incident ray 100 after propagation through the wide-angle lens and into the multiple reflection lens system 2. The ray 102 intercepts the central refracting surface 22 where it is refracted into the ray direction 103 towards the diffusing screen element 41. The screen element 41 is designed to bend rays emerging from the central portion of the multiple reflection lens into a viewing direction substantially normal to the screen surface. Finally the ray 103 is scattered by the screen element 41 into the diffuse directions generally indicated by 104.

Figure 5:
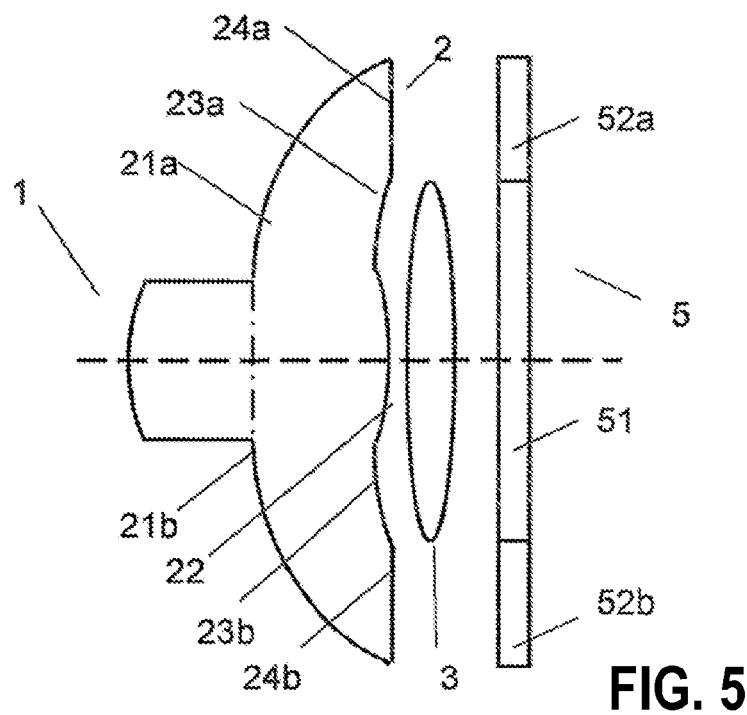
FIG. 5 is a schematic side elevation view of a second embodiment of the invention.

A second embodiment of the proposed wide angle-viewing device is illustrated schematically in FIG. 5. The viewing device comprises the wide-angle lens system 1 and multiple reflection lens system 2 and the diffusing screen 5 and a further lens system 3. Since the characteristics of the wide-angle lens and multiple reflection lens systems are similar to those of the embodiment shown in FIGS. 2-4 the same labels have been used to describe the surface elements. The screen 5 may be based on any of the surface types discussed in relation to the embodiments shown in FIGS. 2-4. The screen comprises a central portion 41 and an outer surrounding portion represented by 41a, 41b. Said inner and outer portions may have substantially different scattering properties.

Figure 6:
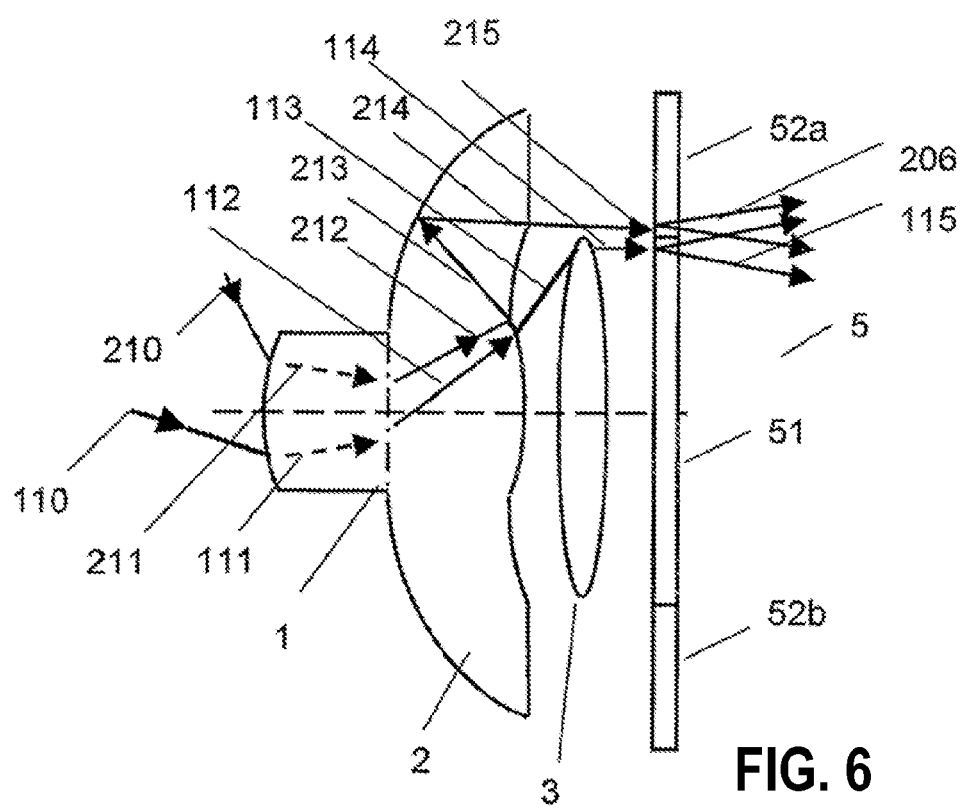
FIG. 6 is a schematic side elevation view showing the propagation of rays in a second embodiment of the invention.

FIG. 6 shows the propagation of incident rays in the meridional plane. The rays are defined in a similar fashion to the rays 100,200 of FIG. 4. We consider a low incidence angle ray 110 and a high incidence angle ray 210. The paths of the rays inside the wide-angle lens systems are represented by the dashed lines 111, 211 where once again the illustration of the light propagation inside said lens has been simplified for the purposes of explaining the invention. It may again be assumed that the wide-angle lens will incorporate an image inverter similar to the ones shown in FIGS. 2C to 2H. After propagation through the wide-angle lens the rays 111, 211 enter the multiple reflection lens as the rays 112 and 212 respectively.

We first consider the propagation of the incident ray 210 after propagation through the wide-angle lens and into the multiple reflection lens system 2. The ray 212 intercepts the first reflection surface 23a and is reflected in the direction 213 towards the second reflection surface 21a where it is reflected into the direction 214. The reflected ray 214 impinges on the refracting surface 24a where it is refracted into the direction 215 towards the screen element 42a. The ray 215 is scattered by the screen element 42a into diffuse ray directions generally indicated by 216.

We next consider the propagation of the incident ray 110 after propagation through the wide-angle lens and into the multiple reflection lens system 2. The ray 112 intercepts the central refracting surface 22 where it is refracted in the ray direction 113 towards the lens element 3. The lens element 3 directs the ray 113 into a direction 114 towards the diffusing screen region 41. Desirably the ray 114 is substantially normal to the screen region 41. Finally, the ray 114 is scattered by the screen element 41 into the diffused directions generally indicated by 115.

Figure 7:
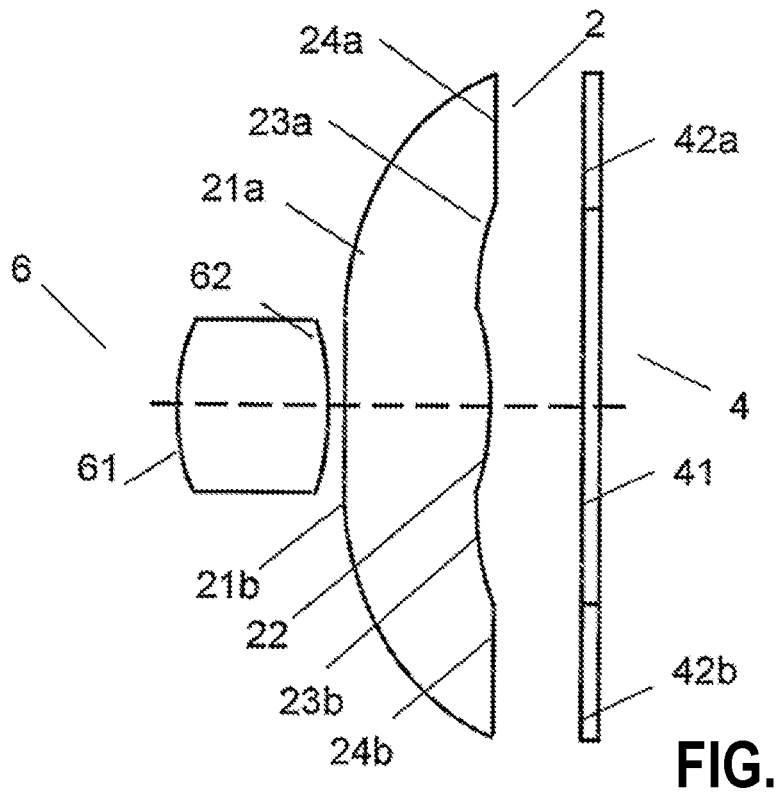
FIG. 7 is a schematic side elevation view of a further embodiment of the invention.

In a further embodiment of the invention, similar to the first embodiment, the wide-angle lens system and the multiple reflection lens system may be separated as shown in FIG. 7. The wide-angle lens system 1 comprises at least a front refracting surface 11 and a rear surface 12. The wide-angle lens may also incorporate an image rotator as discussed earlier. One advantage of having a separation between the wide-angle lens and the multiple reflection lens is that two curved surfaces are available for optimization. The basic imaging properties of the embodiment of FIG. 7 are similar to those of the embodiment shown in FIG. 2-4.

Figure 8:
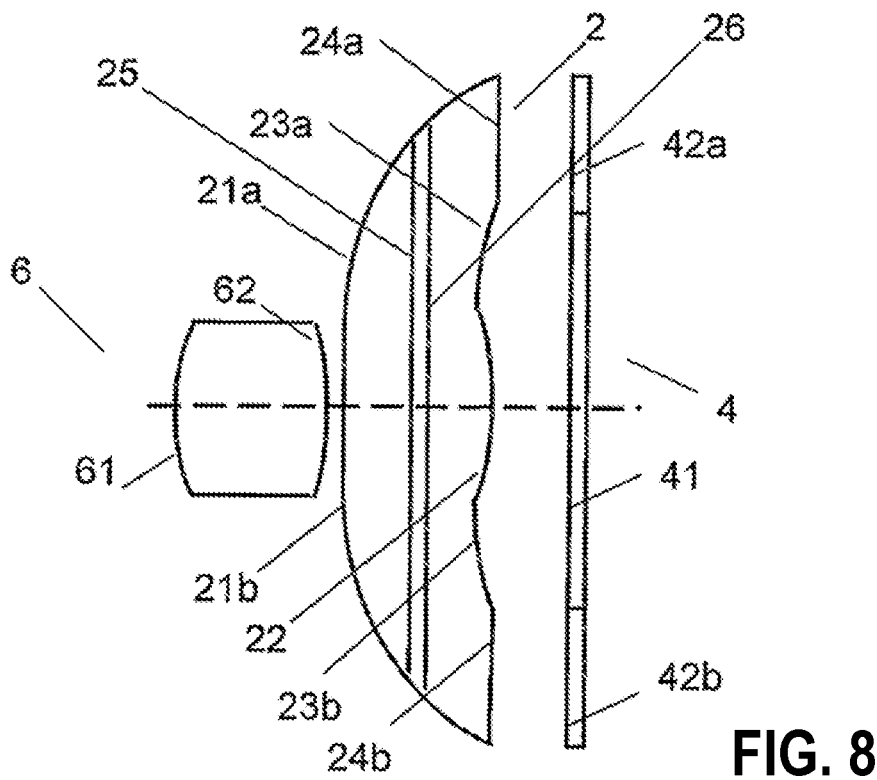
FIG. 8 is a schematic side elevation view of a yet further embodiment of the invention.
Figure 12A:
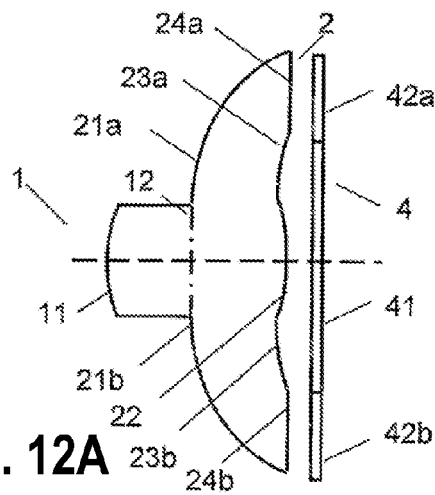
FIG. 12A is a schematic side elevation view of a first embodiment of the invention.
Figure 12B:
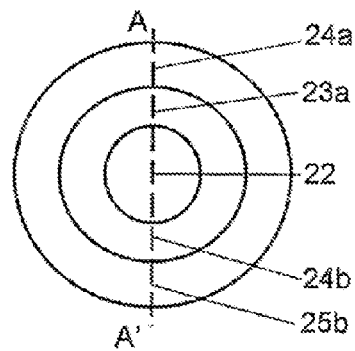
FIG. 12B is a schematic rear elevation view of a first embodiment of the invention.
Figure 12C:
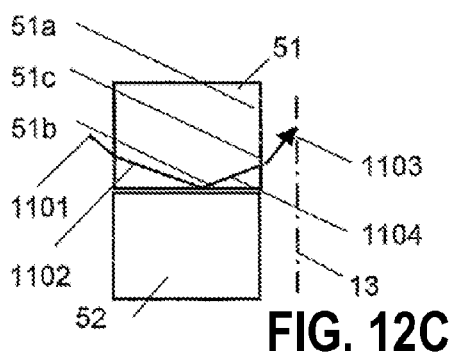
FIG. 12C is a schematic side elevation view of an image inverter that may be used in the invention.
Figure 12D:
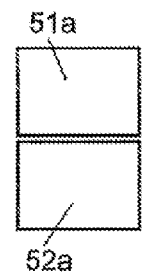
FIG. 12D is a schematic front elevation view of an image inverter that may be used in the invention.
Figure 12E:
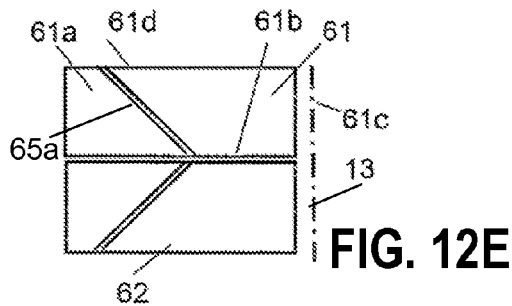
FIG. 12E is a schematic side elevation view of another image inverter that may be used in the invention.
Figure 12F:
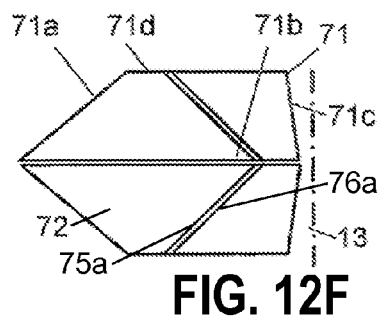
FIG. 12F is a schematic side elevation view of a further image inverter that may be used in the invention.
Figure 12G:
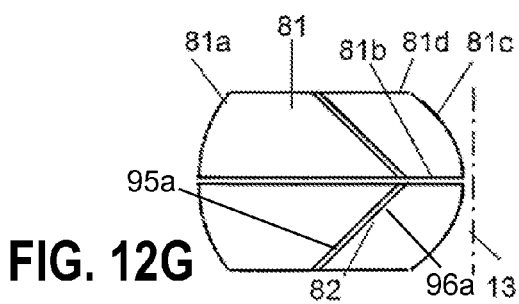
FIG. 12G is a schematic side elevation view of a further image inverter with that may be used in the invention.
Figure 12H:
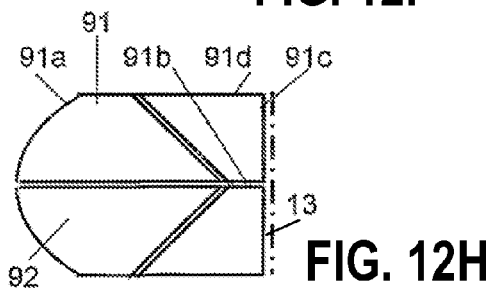
FIG. 12H is a schematic side elevation view of a yet further another image inverter that may be used in the invention.

In a yet further embodiment of the invention similar to the first embodiment, shown in FIG. 8, the multiple reflection lens system may be divided into two elements having opposing separated surfaces 25 and 26 as shown in FIG. 8. Such an arrangement would provide a further two surfaces separated by an air gap for design optimization. Said surfaces may have any of the surface forms discussed earlier. Surfaces 25 and 26 may each be continuous composite surfaces comprising more than one surface form. For example, said composite surfaces may have central circular portions and outer annular portions. Alternatively, surfaces 25 and 26 may have identical but opposite curvatures such that there is no air gap between the two elements. Surfaces 25 and 26 may be planar as shown in FIG. 8. Dividing the multiple reflection lens into two thinner elements may offer cost benefits if moulding processes are used to fabricate the lens elements. The basic imaging properties of the embodiment of FIG. 8 are similar to those of the embodiment shown in FIG. 2.

FIG. 9 shows a further embodiment of the invention in which the multiple reflection lens system is divided into two elements having the opposing separated curved surfaces 27 and 28. Said surfaces may have any of the surface forms discussed earlier. For example, 27 and 28 may each be continuous composite surfaces comprising more than one surface form. Said composite surfaces may have central circular portions and outer annular portions.

It will be clear from consideration of the ray paths shown in FIG. 4 that portions of light beams originating from field of view zones close to the transition between high and low incident angle lights may propagate through the central portion 22 and the first reflection region 23a at the same time. In other words a point in the ambient scene may give rise to light is imaged in to the circular region 300 and the annular region 400 at the same time. This effect could give rise to a visible join between the central and annular regions 300,400. Although a visible boundary is likely to acceptable for most applications it would be advantageous to reduce said boundary to a minimum. Referring again to FIG. 4, the ray 100 is the limiting ray that corresponds to the edge of the circular region 300. In other words rays with incidence angles equal to or less than that of the ray 100 will be imaged in the circular region 300. The ray 200 is the limiting ray that defines the inner edge of the outer annular region 400. In other words rays with incidence angles equal to or greater than that of the ray 200 will be imaged in the annular image region 400. FIG. 10 shows portions of surfaces 21, 22 and 23a of the multiple reflection lens and a portion of the screen 4. We consider the propagation of light rays from an ambient source that are close to the limiting ray. In particle we consider the rays 102a, 102b, 102c,102d. As shown in FIG. 4, rays 102a, 102b are reflected towards surfaces 21a as the rays 302a, 302b by the reflecting surface 23a. Rays 302a, 302b are reflected towards the surface 23a as the rays 402a, 402b and are refracted towards the screen 4 into the directions 502a, 502b by surface 23a forming a focal spot at the point 40. At the same time rays 102c, 102d are transmitted through the surface 22 towards the screen 4 as the rays 103a 103b forming a focal spot near to the point 40.

FIG. 11 shows an example of a type of surface that may be used to perform the functions of the surface 22 and 23 in FIG. 4 and FIG. 10. In FIG. 11 the surface reflects light 105a incident at an angle 110a greater than that of the limiting ray. Light 105b incident at an angle 110b less than or equal to that of the limiting ray is transmitted through the surface 25 into the ray direction 130. It should be noted that the incident light propagates in a refractive index medium. The surface 25 has optical characteristic that allow reflection to take place at angle less than the critical angle defined by the interface between said refractive index medium and air. The surface 25 may be a diffractive or holographic surface. Alternatively the surface may be a Fresnel surface.

In an alternative embodiment of the invention the image inverter schemes illustrated in FIG. 2 are replaced by the alternative inverter schemes shown in FIG. 12. From consideration of FIG. 12 it will be seen that said alternative inverter schemes each have air gaps orientated in an opposite direction to those of FIG. 2. Specifically, the changes are as follows. In FIG. 12E the component 61 now incorporates an air gap bounded by the planar surfaces 65a, 66a. In FIG. 12F the component 71 now incorporates an air gap bounded by the planar surfaces 75a, 76a. In FIG. 12G the component 81 now incorporates an air gap bounded by the planar surfaces 85a, 86a. In FIG. 12H the component 91 now incorporates an air gap bounded by the planar surfaces 95a, 96a.

Figure 13:
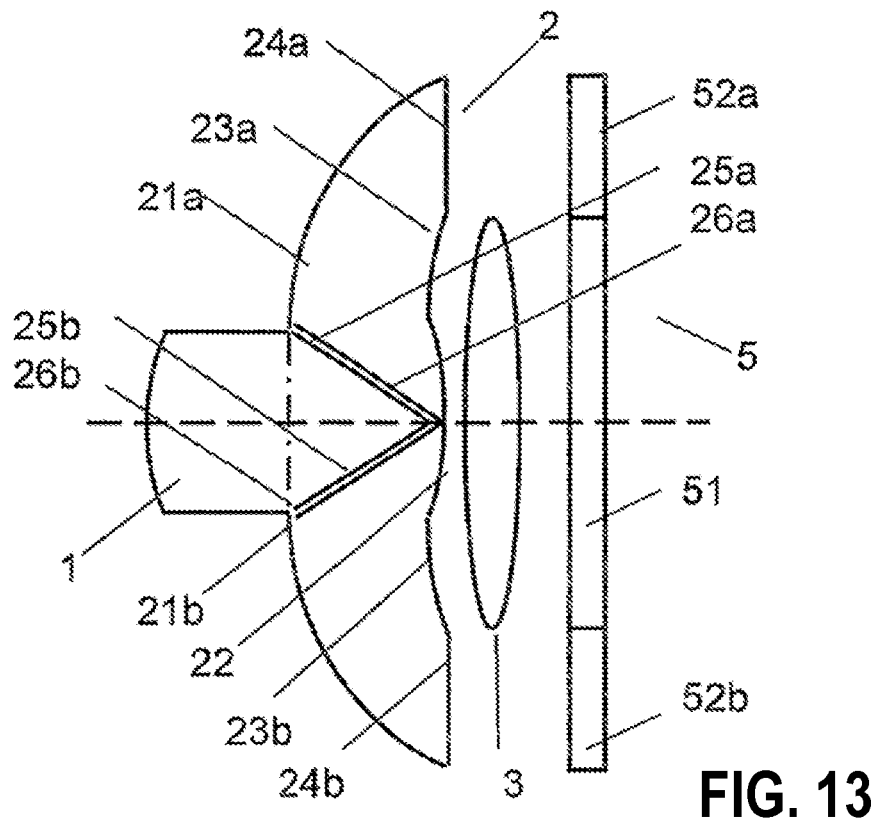
FIG. 13 is a schematic side elevation view of a yet further embodiment of the invention.
Figure 14:
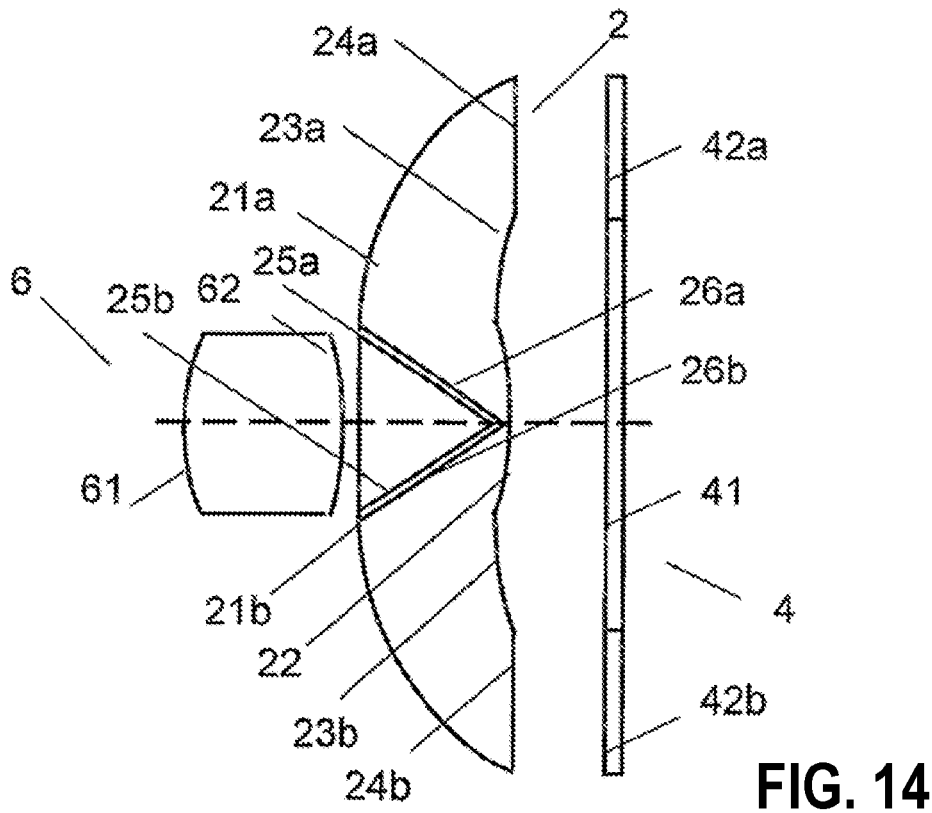
FIG. 14 is a schematic side elevation view of a yet further embodiment of the invention.
Figure 15A:
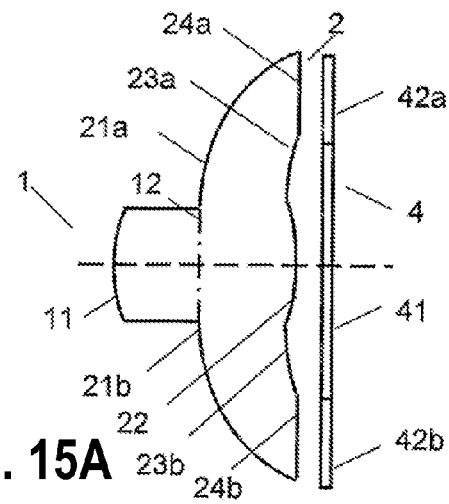
FIG. 15A is a schematic side elevation view of a first embodiment of the invention.
Figure 15B:
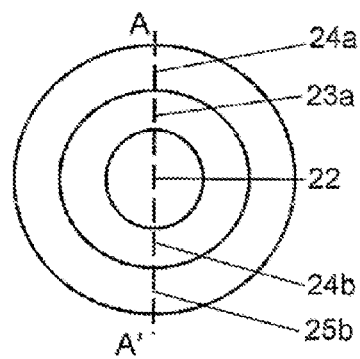
FIG. 15B is a schematic rear elevation view of a first embodiment of the invention.
Figure 15C:
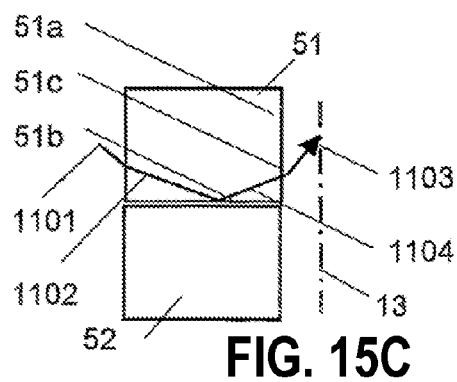
FIG. 15C is a schematic side elevation view of an image inverter that may be used in the invention.
Figure 15D:
FIG. 15D is a schematic front elevation view of an image inverter that may be used in the invention.
Figure 15E:
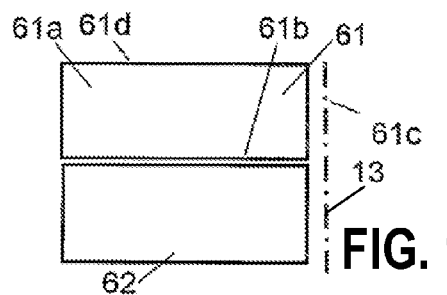
FIG. 15E is a schematic side elevation view of another image inverter that may be used in the invention.
Figure 15F:
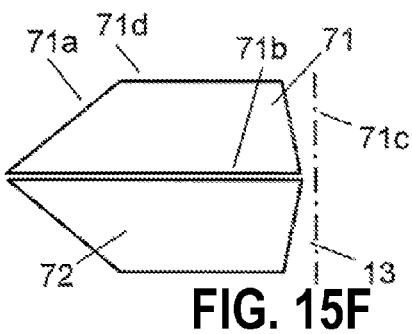
FIG. 15F is a schematic side elevation view of a further image inverter that may be used in the invention.
Figure 15G:
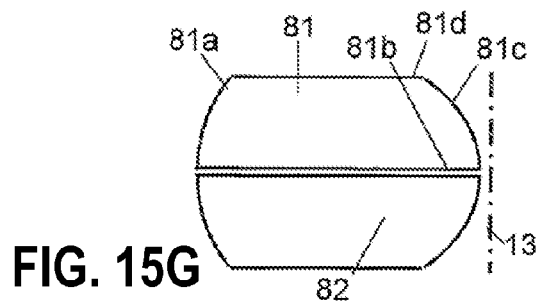
FIG. 15G is a schematic side elevation view of a further image inverter with that may be used in the invention.
Figure 15H:
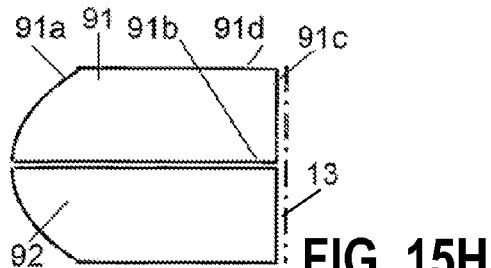
FIG. 15H is a schematic side elevation view of a yet further another image inverter that may be used in the invention.

In the first embodiment of the invention described above stray light is eliminated by providing air spaces and critical angle surfaces in then image inverter. The objects of the invention are achieved in further embodiments of the invention in which the air gaps and critical angle surfaces are provided within the multiple reflection lens of the first embodiment. Examples of such alternative embodiments are shown in FIG. 13-14. The embodiments shown in FIG. 13 and FIG. 14 are identical to the embodiments of FIG. 5 and FIG. 7 respectively except that the multiple reflection lens of the first embodiment is divided into first and second optical elements separated by small air gaps. The first element of the MLR has a first surface portion that admits light from the wide-angle lens and a second surface portion defined by 25a and 25b. The second element has a first surface portion defined by 26a and 26b of the same shape as the second surface of the first element and a second surface. The second surface of the first element and the first surface of the second element are separated by a small air gap. The second surface of the first element operates as a total internal reflection surface for light from the external scene incident in directions that did not result in a reflection at the planar reflecting surface. Incident ambient light that is not directed out of the multiple reflection lens by the second surface of the first element is imaged according to the principles of the first embodiment of the invention. Referring to FIG. 13 and FIG. 14 it will be seen that air gaps are provided between the surfaces 25a,26a and the surfaces 25b,26b. Surfaces 25a and 26a have substantially similar forms. Surfaces 25b and 26b have substantially similar forms. Surfaces 25a,26a and the surfaces 25b,26b shown in FIGS. 13-14 may represent planar surfaces. In alternative embodiments surfaces 25a,26a and the surfaces 25b,26b shown in FIGS. 13-14 may represent curved surfaces. In alternative embodiments surfaces 25a, 26a and the surfaces 25b,26b shown in FIGS. 13-14 may represent cross sections of conical surfaces. Apart from the provision of the said air gaps the function of the multiple reflection lens is identical to that of the first embodiment of the invention as discussed above Note that in the alternative embodiments of the invention shown in FIGS. 13-14 the image inverter comprises a pair of identical optical components, each further comprising an input surface, a reflecting surface and an exit surface. The image inverter does not include air gaps. Typical examples of image inverters without air gaps for use in said alternative embodiment are shown in FIG. 15. Apart from the elimination of air gaps the image inverters shown in FIG. 15 are identical to the ones illustrated in FIG. 2 or FIG. 12.

Figure 16:
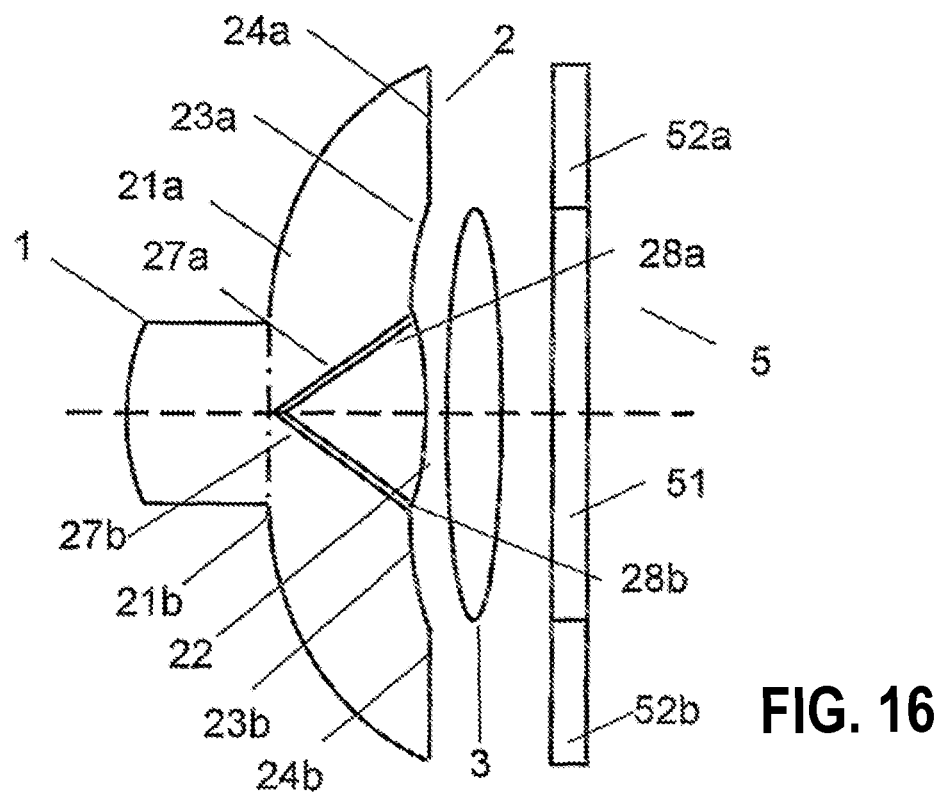
FIG. 16 is a schematic side elevation view of a yet further embodiment of the invention.
Figure 17:
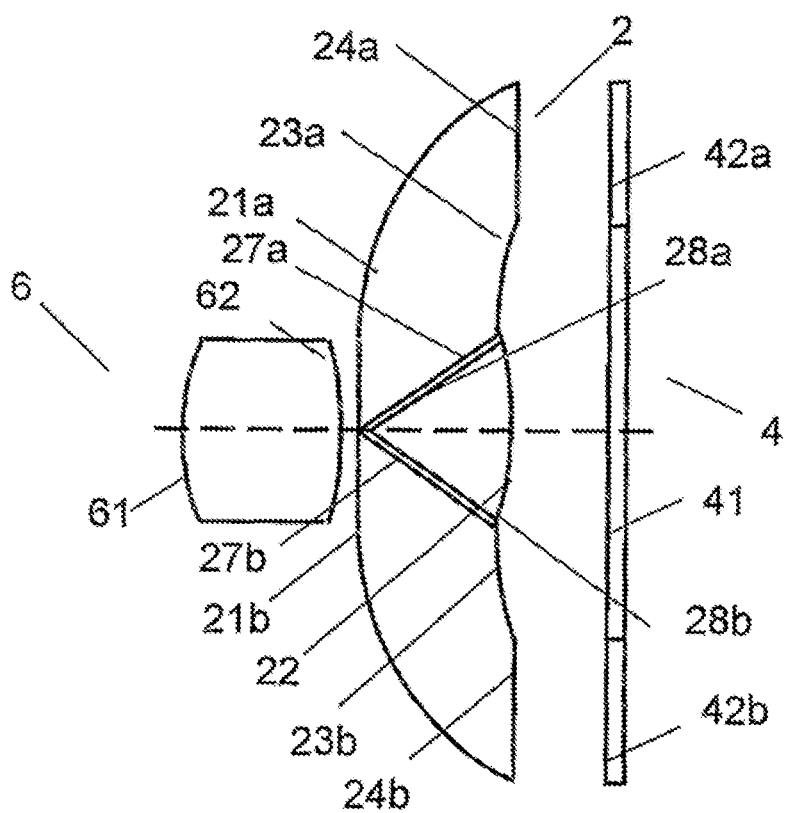
FIG. 17 is a schematic side elevation view of a yet further embodiment of the invention.

In an alternative embodiment of the invention illustrated in FIGS. 16-17 the air gaps are be orientated in an opposing direction to those illustrated in FIGS. 13-14. Specifically, in FIGS. 16-17 the multiple reflection lens now incorporates an air gap bounded by air separated surfaces 27a, 27b and 28a, 28b where said air separated surfaces have substantially similar forms.

We next consider embodiments of the invention that do not use the above described multiple reflection lens.

The objects of the invention are achieved in particular embodiments comprising a wide-angle lens and a diffusing screen. Said particular embodiments of the invention are illustrated schematically in the side elevation views of FIG. 18. In each case the wide-angle lens incorporates an image inverter. The image inverter in said particular embodiments is substantially the same as the one used in the embodiments of FIG. 2. The image inverter comprises a pair of identical upper and lower components. Said upper component is operative to provide a vertical inversion to light incident above a predetermined angle of incidence and said lower component is operative to provide a vertical inversion to light incident below a predetermined angle of incidence. Each component further comprises an input surface that admits light from the external scene, a reflecting surface and an exit surface. The reflecting surfaces of said components are disposed back-to-back substantially overlapping and parallel to each other. Each component is divided into first and second optical elements disposed in sequence along the light path from the external scene. The first element has a first surface that provides the input surface of the image inverter and a second surface. The second element has a first surface of the same shape as the second surface of the first element and a second surface that provides the exit surface of the image inverter. The second surface of the first element and the first surface of the second element are separated by a small air gap. The second surface of the first element operates as a total internal reflection surface for light from the external scene incident in directions that will not result in a reflection at the planar reflecting surface. Incident ambient light that is not directed out of the inverter by the second surface of the first element passes through the input surface is reflected by said reflecting surface and finally passes through the exit surface. At least one of said first surface of said first element and said second surface of said second element may be curved. At least one of said first surface of said first element and said second surface of said second element may be tilted surfaces. The wide-angle lens may further comprise at least one separated optical element disposed between the inverter and the screen. The wide-angle lens may further comprise at least one separate optical element disposed between the external scene and the inverter.

Since the details of the image inverters that may be used in the invention have already been illustrated in FIG. 2 and FIG. 12 the details of the image inverter are not shown in the schematic illustrations of FIG. 18.

Figure 18A:
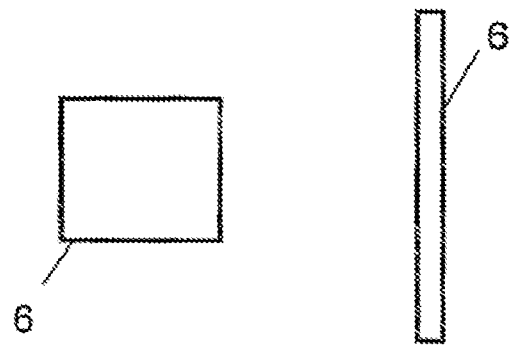
FIG. 18A is a schematic side elevation view of a particular embodiment of the invention.

In the embodiment of the invention shown in the side elevation view of FIG. 18A the wide-angle lens comprises an image inverter of the type illustrated in FIGS. 2G-2H in which optical power is provided by the image inverter.

Figure 18B:
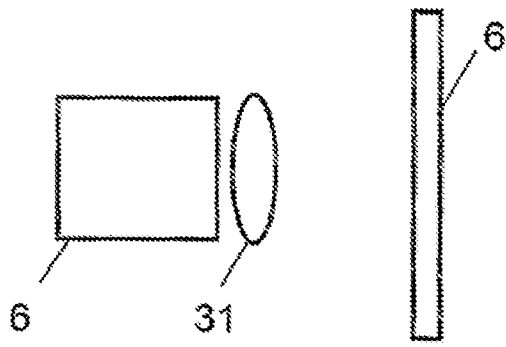
FIG. 18B is a schematic side elevation view of another particular embodiment of the invention.

In the embodiment of the invention shown in the side elevation view of FIG. 18B the wide angle lens comprises an image inverter of the type illustrated in FIGS. 2E-2H and a further lens element disposed between said inverter and said screen.

Figure 18C:
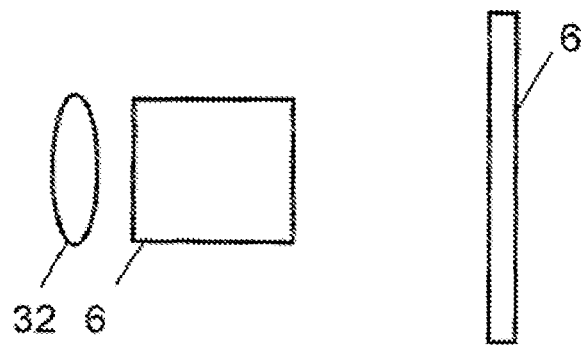
FIG. 18C is a schematic side elevation view of another particular embodiment of the invention.

In the embodiment of the invention shown in the side elevation view of FIG. 18C the wide angle lens comprises an image inverter of the type illustrated in FIGS. 2E-2H and a further lens element disposed between said inverter and the eternal scene.

Figure 18D:
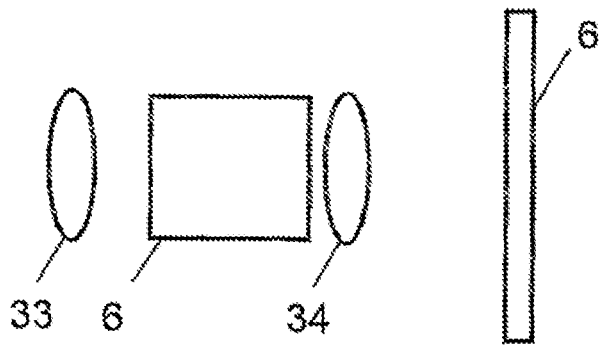
FIG. 18D is a schematic side elevation view of another particular embodiment of the invention.

In the embodiment of the invention shown in the side elevation view of FIG. 18D the wide angle lens comprises an image inverter of the type illustrated in FIGS. 2E-2H, a lens element disposed between said inverter and the external scene and a further lens element disposed between said inverter and said screen.

In any of the embodiment shown in FIGS. 18A-D the lens elements used in conjunction with the image inverter the wide angle lens may be replaced by multi element lens systems, mirrors, diffractive optical elements or any other type of imaging components used in the design of wide-angle lens systems.

The basic invention is not restricted to door security viewers. Possible applications include viewers for use in vehicles and process monitoring. The invention could be used to provide visual access in many application domains where cost factors, hazardous environments or privacy requirements preclude the use of windows. The invention may also be configured to operate at much closer object conjugates than those required for security. For example, the invention may provide a magnifier for the inspection of textiles, printed materials. In many applications it may be advantageous to incorporate an illumination sources such as an LED, laser or incandescent lamp.

Image formation by the door viewer has been described in terms of rotationally symmetric optical surfaces. However, the viewer may also use optical elements on based other forms such as cylindrical elements or anamorphic optical elements. The optical elements discussed in FIGS. 2-8 may be fashioned to provide elliptical cross sections. Alternatively, portions of the optical elements may be removed to provide rectangular cross sections.

In a typical door viewer application the subject being viewed is likely to be in line with or below the optical axis of the viewer. Hence, the emergent rays corresponding to the centre of the subject will typically be along the optical axis or at some angle above the optical axis. It is therefore desirable that the viewing screen should have asymmetrical diffusion properties such that light hitting the screen is bent towards the nominal viewing position.

The design of the door viewer will require careful optimization to maximize light throughput and minimize aberrations and distortions. For example, chromatic aberration may be traded off against image distortion.

The refracting and reflecting surfaces of the door viewer may employ spherical, aspherical, and diffractive and other optical surface forms known to those skilled in the art. Diffractive optical surfaces in particular may play a key role in optimizing the performance. The use of diffractive optical surfaces will offer considerable form factor benefits, including reducing the required door hole size and minimizing the distance of the viewer screen from the door surface. Any of the optical surfaces used in the viewer may incorporate diffractive forms for the purposes of color correction. Further benefits of using diffractive surface forms include improving the image resolution of the image and compensating for chromatic aberrations. Other benefits of using diffractive surfaces will be familiar to those skilled in the art of optical design.

The viewer may incorporate an ancillary light source for viewing in poor lighting conditions.

It will be clear to those skilled in the art that the invention could also be applied with the directions of the ray paths reversed.

It will be clear from consideration of FIGS. 2C-2G that in each case half the image inverter may be used for the purposes of forming images of either the upper or lower portions of the field of view.

It will be clear from consideration of the drawings that since the display apparatus is symmetrical around the plane of image inverter reflection surfaces a display using either the upper or lower portions of the apparatus may be provided.

Although the invention has been described in relation to what are presently considered to be the most practical and preferred embodiments, it is to be understood that the invention is not limited to the disclosed arrangements, but rather is intended to cover various modifications and equivalent constructions included within the spirit and scope of the invention.

What is claimed is:

1. An apparatus for displaying an image comprising:
a wide-angle lens and a screen;
wherein said wide angle lens forms an erect image of an external scene at said screen,
wherein said wide-angle lens incorporates an image inverter,
wherein said image inverter comprises upper and lower components,
wherein said upper component is operative to provide a vertical inversion to light incident above a predetermined angle of incidence and said lower component is operative to provide a vertical inversion to light incident below a predetermined angle of incidence,
wherein each said component comprises an input surface that admits light from said external scene, a reflecting surface and an exit surface,
wherein said components are symmetrically disposed about an axis of symmetry of said apparatus
wherein said reflecting surfaces are disposed back to back and substantially overlap,
wherein each said component is divided into first and second optical elements disposed in sequence,
wherein said first element has a first surface that provides said input surface and a second surface, wherein said second element has a first surface of the same shape as said second surface of the first element and a second surface that provides said exit surface,
wherein said second surface of said first element and said first surface of the second element are separated by an air gap, and
wherein said second surface of said first element operates as a total internal reflection surface for light from said external scene incident in directions that do not intercept said reflecting surface.

2. The apparatus of claim 1 wherein at least one of said first surface of said first element and said second surface of said second element are curved.

3. The apparatus of claim 1 wherein at least one of said first surface of said first element and said second surface of said second element are tilted planar surfaces.

4. The apparatus of claim 1 wherein at least one of said first surface of said first element and said second surface of said second element are conical surfaces.

5. The apparatus of claim 1 wherein said reflecting surface is a total internal reflection surface.

6. The apparatus of claim 1 wherein said reflecting surface is divided into two portions by said first and second elements.

7. The apparatus of claim 1 wherein said wide angle lens comprises least one lens disposed between said wide said image inverter and said screen.

8. The apparatus of claim 1 wherein said wide angle lens comprises least one lens disposed between said external scene and said image inverter.

9. An apparatus for displaying an image comprising:
a wide-angle lens and a screen;
wherein said wide-angle lens incorporates an image inverter,
wherein said image inverter comprises identical upper and lower components,
wherein each said component comprises an input surface that admits light from said external scene, a reflecting surface and an exit surface,
wherein said reflecting surfaces are disposed back to back and substantially overlap,
wherein each said component is divided into first and second optical elements disposed in sequence,
wherein said first element has a first surface that provides said input surface and a second surface, wherein said second element has a first surface of the same shape as said second surface of the first element and a second surface that provides said exit surface, and
wherein said second surface of said first element and said first surface of the second element are separated by an air gap.

10. An apparatus for displaying an image comprising:
a wide-angle lens; a multiple reflection lens; and a screen;
wherein said wide-angle lens admits light from an external scene;
wherein said multiple reflection lens comprises:
a first light transmitting surface operative to admit light from said wide-angle lens;
a second light transmitting surface operative to transmit light towards a viewer;

a third light transmitting surface operative to transmit light towards a viewer;

a first light reflecting surface; and a second light reflecting surface;

wherein said wide-angle lens incorporates an image inverter, wherein said image inverter comprises upper and lower components, wherein said upper component is operative to provide a vertical inversion to light incident above a predetermined angle of incidence and said lower component is operative to provide a vertical inversion to light incident below a predetermined angle of incidence, wherein each said component comprises an input surface that admits light from said external scene, a reflecting surface and an exit surface, wherein said components are symmetrically disposed about an axis of symmetry of said apparatus wherein said reflecting surfaces are disposed back to back and substantially overlap, wherein each said component is divided into first and second optical elements disposed in sequence, wherein said first element has a first surface that provides said input surface and a second surface, wherein said second element has a first surface of the same shape as said second surface of the first element and a second surface that provides said exit surface, wherein said second surface of said first element and said first surface of the second element are separated by an air gap, wherein said second surface of said first element operates as a total internal reflection surface for light from said external scene incident in directions that do not intercept said reflecting surface wherein a first multiplicity of optical paths from said external scene to said viewer passes through said first transmitting surface, traverses at least one light refracting medium and passes through said second transmitting surface; and wherein a second multiplicity of optical paths from said external scene to said viewer passes through said first transmitting surface, undergoes a first reflection at said first reflecting surface and a second reflection at said second reflecting surface, and passes through said third transmitting surface; said optical paths traversing at least one light refracting medium.

11. The apparatus of claim 10 wherein a diffusing screen is disposed between said multiple reflection lens and said viewer.

12. The apparatus of claim 10 wherein said image inverter comprises a pair of identical optical elements, each further comprising an input surface, a planar reflecting surface and an exit surface, wherein said optical elements are symmetrically disposed about an axis of symmetry of said multiple reflection lens and wherein said planar reflecting surfaces substantially abut.

13. The apparatus of claim 10 wherein said first multiplicity of optical paths corresponds to incident light having an angle of incidence at said first transmitting surface less than or equal to a predefined value, and wherein said second multiplicity of optical paths corresponds to incident light having an angle of incidence at said first transmitting surface greater than said predefined value.

14. The apparatus of claim 10 wherein said first multiplicity of optical paths corresponds to incident light having angle of incidence less than the critical angle at said first reflecting surface, and wherein said second multiplicity of optical paths corresponds to incident light having high angle of incidence greater than or equal to the critical angle at said first reflecting surface.

15. The apparatus of claim 10 wherein said second reflecting surface surrounds said first transmitting surface, wherein said first reflecting surface surrounds said second transmitting surface and wherein said third transmitting surface surrounds both said first reflecting surface and said second transmitting surface.

16. The apparatus of claim 10 wherein a lens and a diffusing screen are disposed in series between said multiple reflection lens and said viewer.

* * * * *

UNITED STATES PATENT AND TRADEMARK OFFICE
CERTIFICATE OF CORRECTION

Page 1 of 1

PATENT NO.        : 8,186,837 B2
APPLICATION NO.   : 12/517129
DATED             : May 29, 2012
INVENTOR(S)       : Milan Momcilo Popovich It is certified that error appears in the above-identified patent and that said Letters Patent is hereby corrected as shown below:

Column 18, Line 33, Claim 7:

After "wide angle lens comprises" insert -- at --.

Column 18, Line 36, Claim 8:

After "wide angle lens comprises" insert -- at --.

Signed and Sealed this
Twenty-seventh Day of November, 2012

David J. Kappos
*Director of the United States Patent and Trademark Office*